C. MURRAY.
Wheel Harrow.
No. 229,548.                     Patented July 6, 1880.
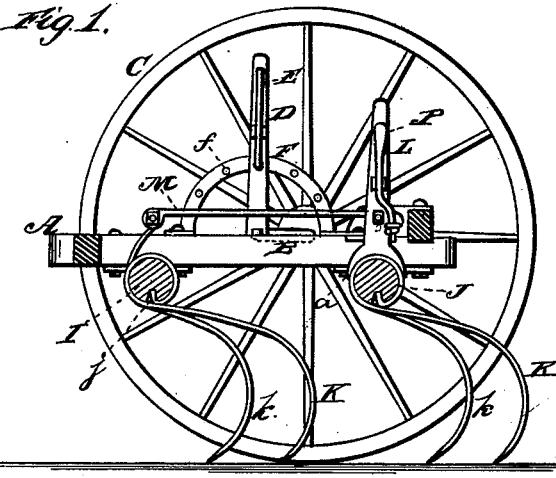
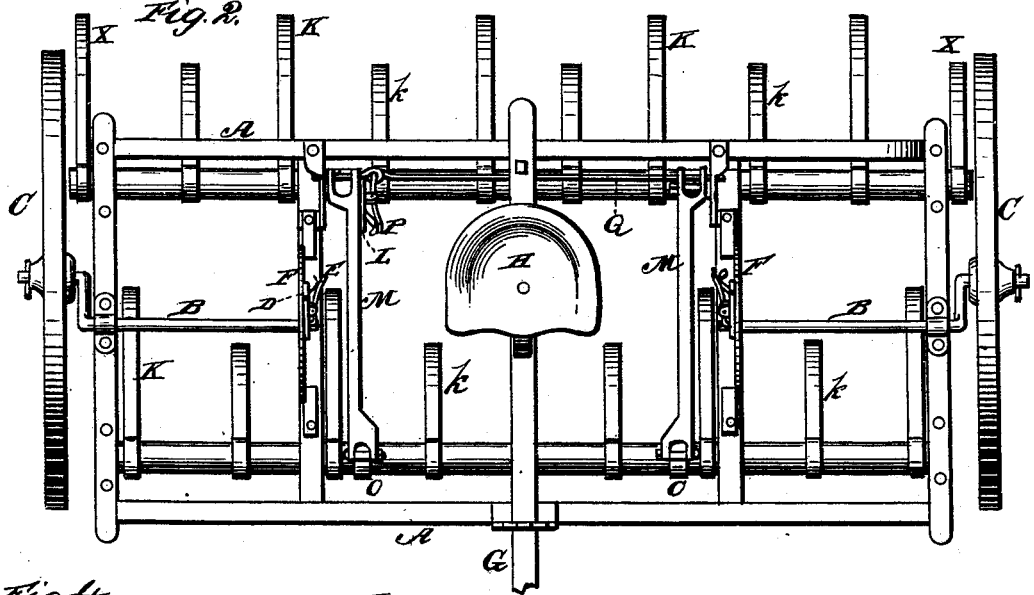
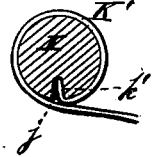
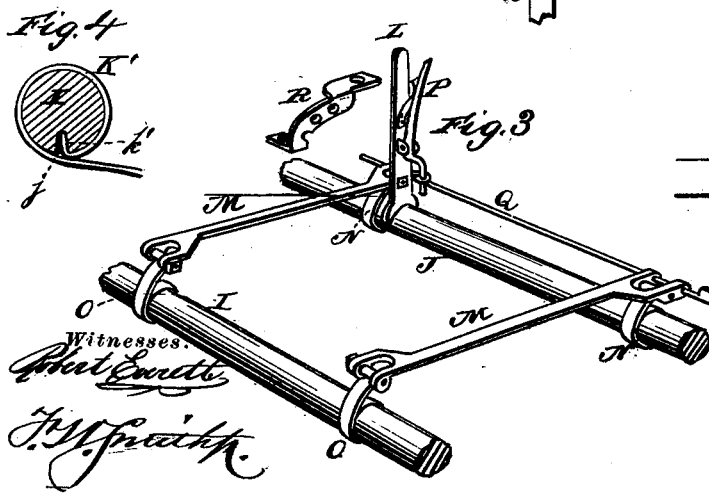
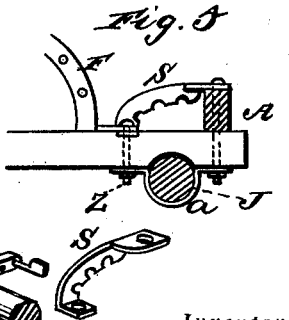

UNITED STATES PATENT OFFICE.

CRAIG MURRAY, OF VICKSBURG, MICHIGAN.

WHEEL-HARROW.

SPECIFICATION forming part of Letters Patent No. 229,548, dated July 6, 1880.

Application filed February 17, 1880.

*To all whom it may concern:*

Be it known that I, CRAIG MURRAY, of Vicksburg, in the county of Kalamazoo and State of Michigan, have invented certain new and useful Improvements in Wheel-Harrows; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to that class of wheel-harrows in which rocking shafts are employed for carrying and operating the teeth.

It consists in divers improvements in the details of the machine, as hereinafter more particularly set forth and claimed.

In the accompanying drawings, Figure 1 represents a vertical cross-section through my improved harrow. Fig. 2 represents a plan view of the same. Fig. 3 represents, in detail, a perspective view of the devices for raising and lowering the teeth without moving the frame. Figs. 4 and 5 represent sectional details.

A designates the frame of my cultivator, which is borne by short crank-axles B of transporting-wheels C. To each axle a lever, D, is connected, provided with a spring-pressed pawl, E, which engages with perforations $f$ of a segmental bar, F, fixed upon frame A. By means of these devices the frame of the harrow may be raised at will, so as to hold the teeth above the surface of the ground, and locked in that position while going to or from the place of working. It may also be lowered into position for harrowing and locked there by means of the said devices, and may also be used to raise or lower either side of the frame to suit any unevenness of the ground.

G designates the tongue or draft-pole of the harrow, which is extended back across the top of the frame and supports a driver's seat, H. I and J represent, respectively, the front and rear rocking shafts or rollers, which extend transversely to the line of draft, and are free to turn in bearings $a$ $a$ attached to the end pieces of the frame A. Each of these shafts has attached to it a series of spring-teeth, consisting of alternating long teeth K and short teeth $k$. These teeth are attached to said shafts or rollers by providing each shaft or roller with a longitudinal slot or groove, $j$, forcing the attaching end $k'$ of the tooth into said slot or groove, as shown in Fig. 4, and then sliding the tooth into position, where it is firmly held in operation by the winding force around the shaft or roller, so as to form a ring, K'. This makes a very secure and expeditiously-applied attachment, and will allow the tooth to be readily removed for repairs.

It is desirable to provide means for regulating the depth of all the teeth at once, or raising them all out of engagement with the soil, without in either case changing the position of the frame A, on which the driver is carried. For this purpose I employ a lever, L, which is pivoted to said frame and connected at its lower end to rear rock-shaft or roller, J. Said lever works backward and forward, so as to rotate or rock said shaft in either direction at will. This motion of rock shaft or roller J is communicated to forward rock shaft or roller, I, through stout bars M, which extend from spring bars or plates N on shaft J to similar spring bars or plates O on shaft I. These bars or plates are attached to shafts I J in the same manner as the teeth, and their connection to bars M is hinged or pivotal to avoid wear. The rocking of these shafts or rollers by said lever L necessarily raises or lowers the teeth K $k$. These latter may be locked in any position of such adjustment by means of a spring-pressed pawl or lock-lever, P, which operates a transverse rod, Q, engaging at one end with perforated bar R, and at the other with notched bar S, both of which bars are attached to the frame. Said rod is straight at the end which enters the perforations of segmental bar R, and bent into a hook at the end which enters into the notches of segmental bar S. The arrangement of the rod Q with relation to these parts is such that the action of the spring or pawl or lever P tends to cause the interlocking of said rod and racks or bars, while pressure applied to said pawl or lever will release them.

By means of the devices above described the driver can, by a single movement of one lever, adjust the depth of all the harrow-teeth without changing the position of frame A, on which he is carried. More than two rollers or rock shafts may be connected and operated in the same manner. One rack also may be employed instead of the two R S. Various other changes may be made without departing from the spirit of my invention.

The rear roller or shaft, J, extends at both ends beyond frame A, and carries at each end a tooth, X, which harrows the ground close to the wheel.

The same fastening-bolts Z Z are employed to attach the segmental perforated bars F and R, the notched bar S, and the bearings of the shafts and axles. The bearings for the inner ends of the crank-axles are formed in the segmental bars F, or in permanent attachments thereof.

The tongue or draft-pole G connects to back part of frame, so as to give full strength of frame.

At the point where the blunt end of each tooth enters the groove in its shaft or roller the ring formed in said tooth constitutes a round bearing, which prevents any liability of the tooth breaking. By pressing on said blunt end of the tooth the said ring prevents the tooth from pulling out. The greater the strain the more secure will be the attachment.

By using alternating teeth of different lengths, as described, each shaft is made to practically carry two sets of teeth instead of one. The pulverization of the soil will consequently be much more thorough.

Having thus described my invention, what I claim as new is—

1. In combination with rollers or shafts I J, teeth K k, and lifting-lever L, the spring arms or bars N O and connecting-bars M, hinged thereto, as set forth.

2. In combination with lever L and rock-shaft J, the pawl P, rod Q, straight at one end and bent at the other, perforated rack or bar R, and notched rack or bar S, substantially as set forth.

3. In combination with frame A, segmental bars F and R, notched bar S, and the bearings for the shafts or rollers and the axles, and the bolts Z Z, which attach said parts by one fastening.

In testimony that I claim the foregoing I have hereunto set my hand this 13th day of February, 1880.

CRAIG MURRAY.

Witnesses:
  OSCAR T. TUTHELL,
  W. S. MCKINNEY.